Figure 1:
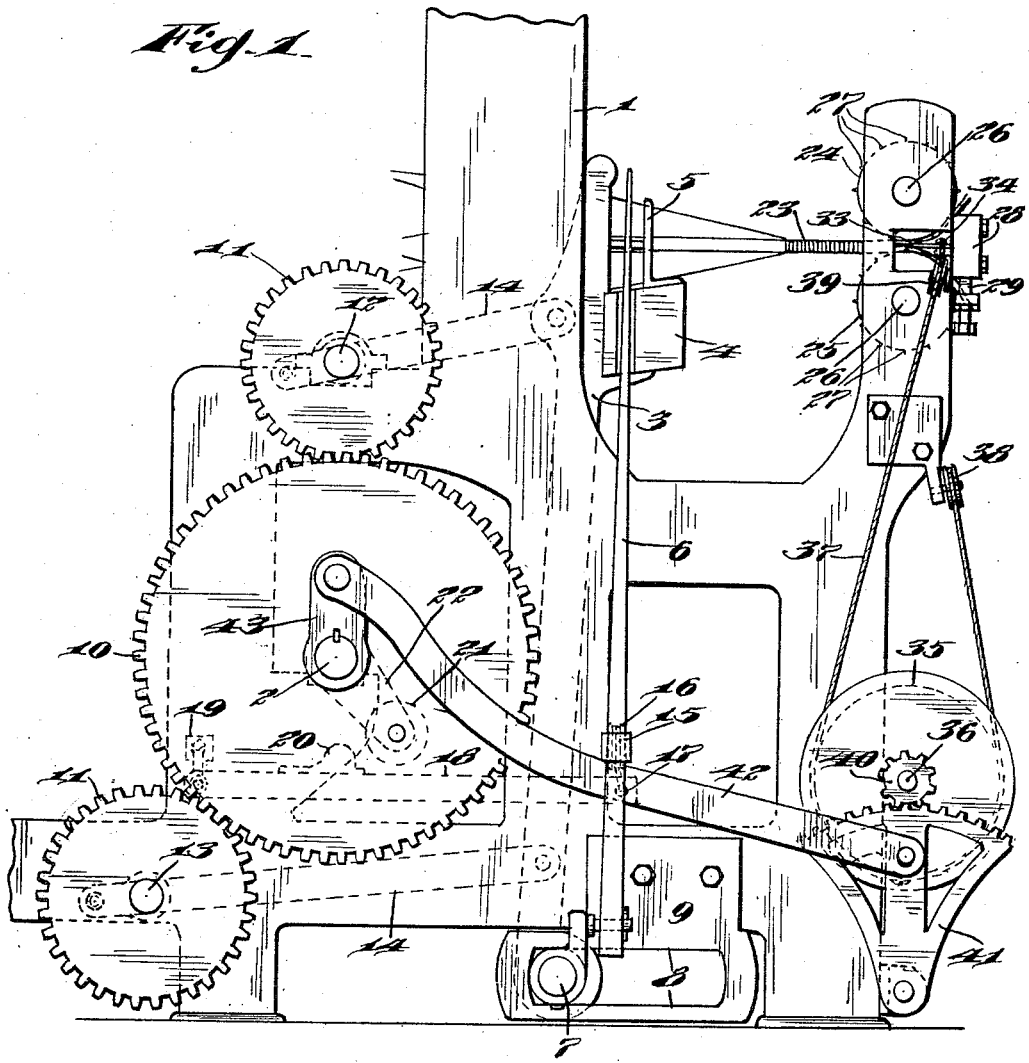

A. MANN.
DRIVING AND LAY MOTION FOR LOOMS.
APPLICATION FILED APR. 8, 1910.

1,006,110.

Patented Oct. 17, 1911.
4 SHEETS—SHEET 1.

Witnesses

Inventor
Albert Mann,
By Joshua R. H. Potts
Attorney

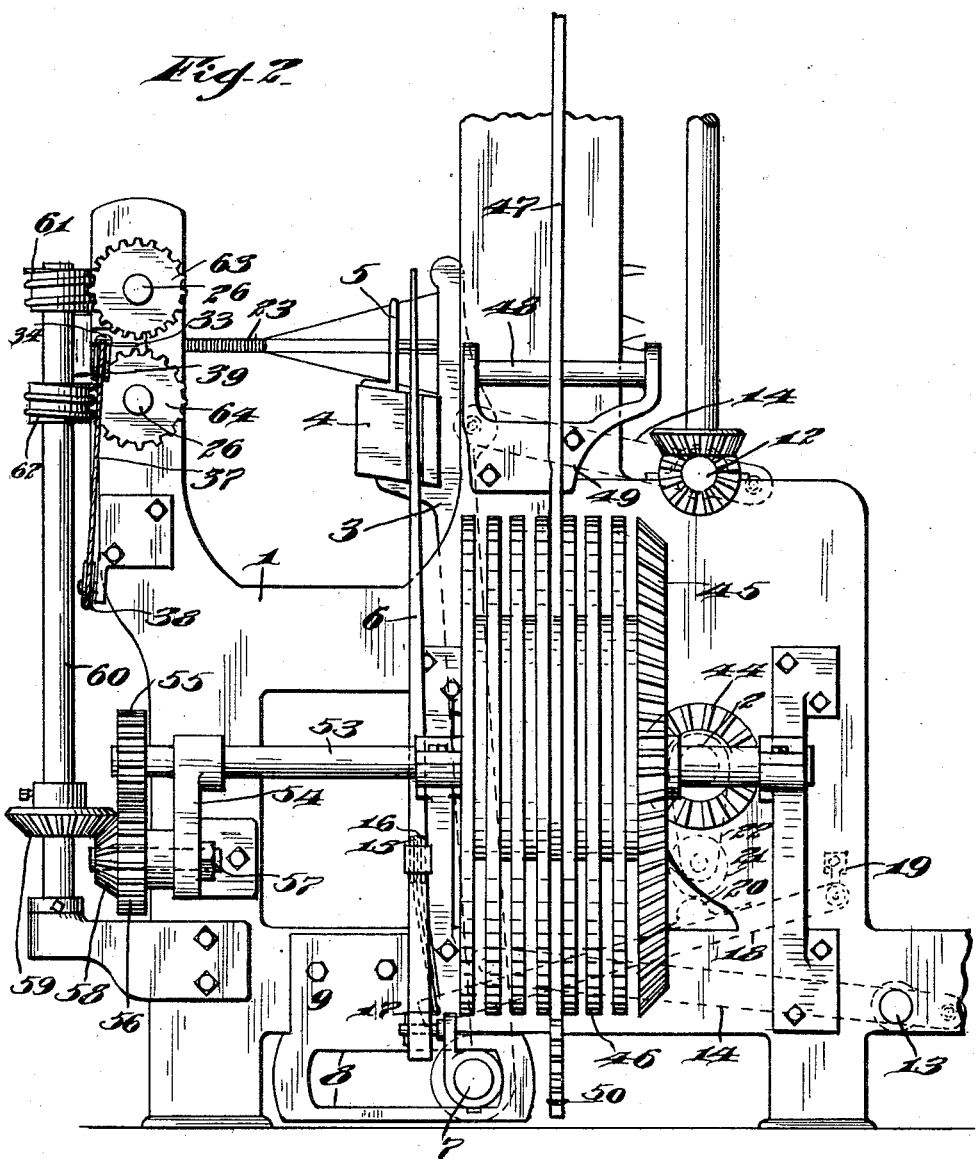

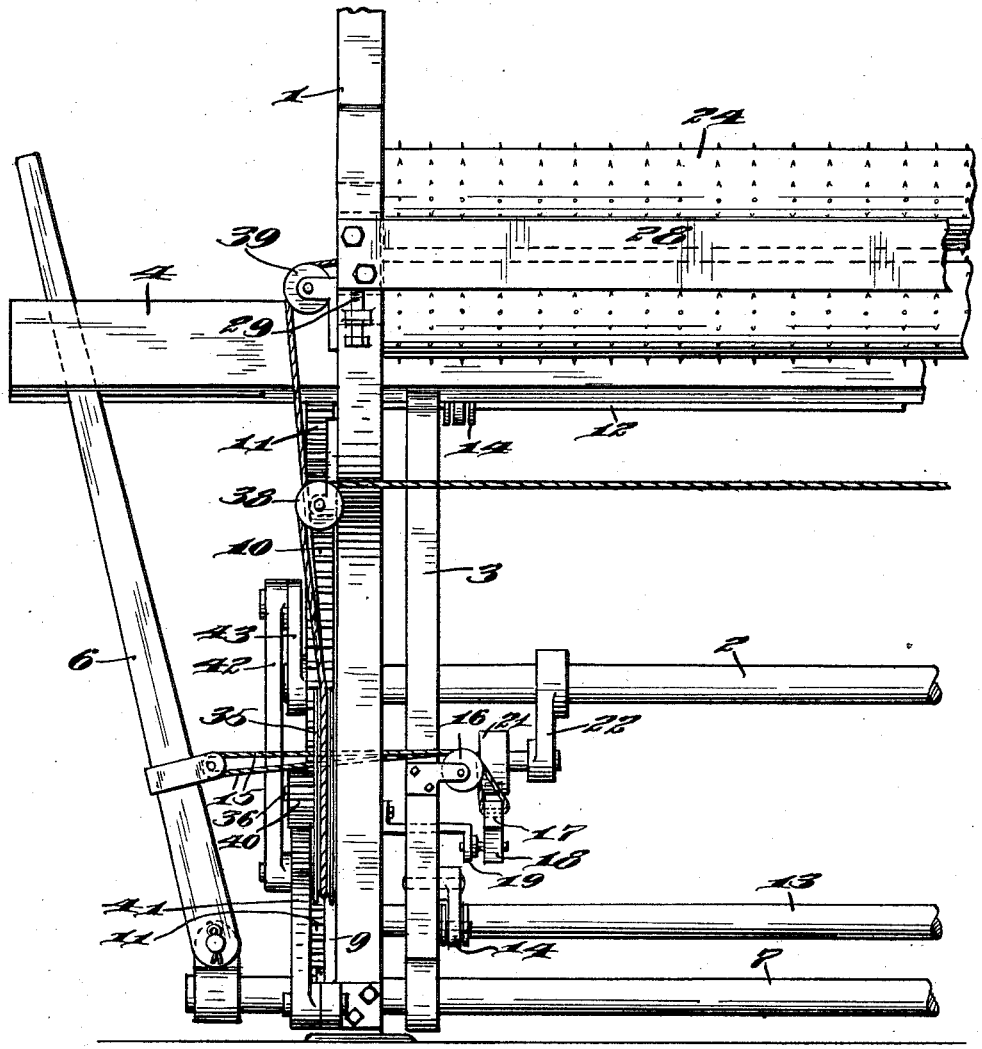

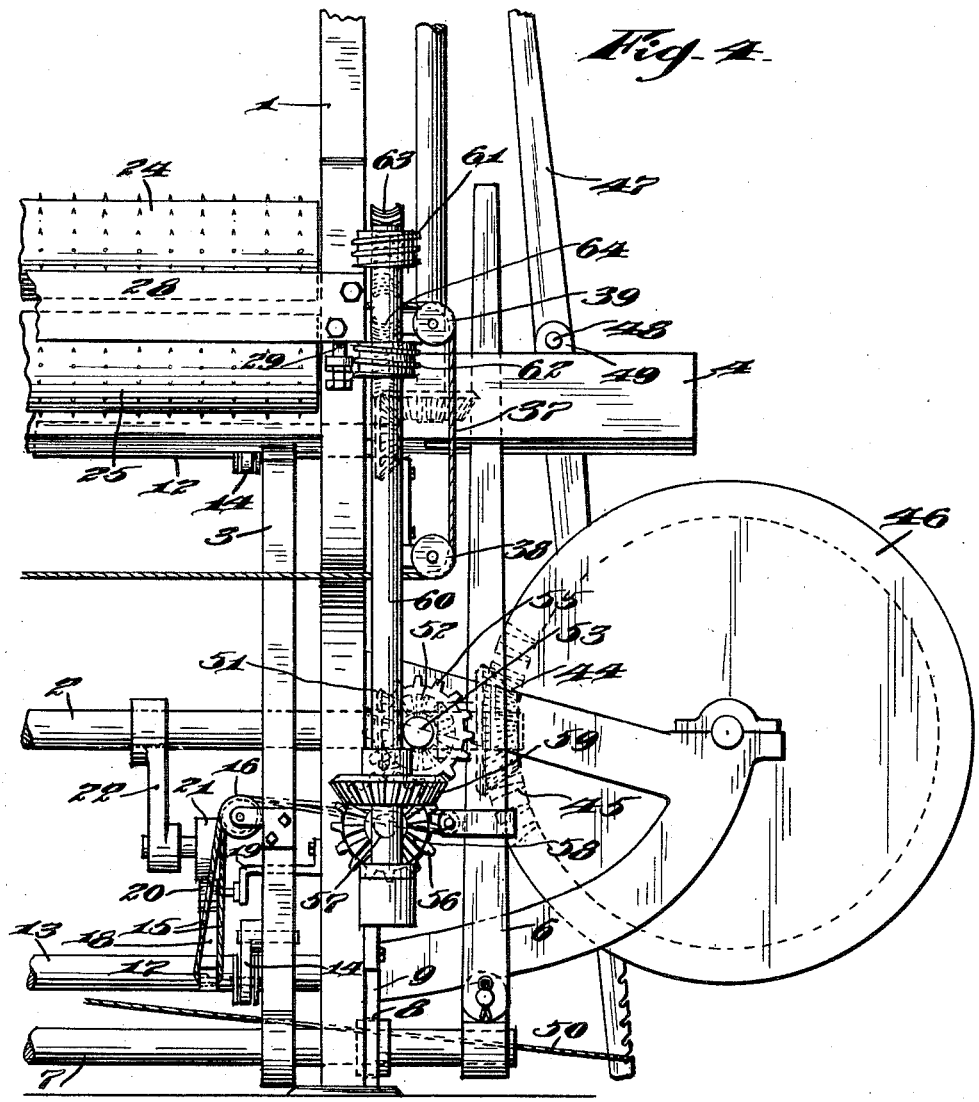

UNITED STATES PATENT OFFICE.

ALBERT MANN, OF PHILADELPHIA, PENNSYLVANIA.

DRIVING AND LAY MOTION FOR LOOMS.

1,006,110.  Specification of Letters Patent.  Patented Oct. 17, 1911.

Application filed April 8, 1910. Serial No. 554,178.

*To all whom it may concern:*

Be it known that I, ALBERT MANN, a citizen of the United States, residing at Philadelphia, in the county of Philadelphia and State of Pennsylvania, have invented certain new and useful Improvements in Driving and Lay Motion for Looms, of which the following is a specification.

My invention relates to improvements in looms, more particularly designed for weaving plush and velvet, the object of the invention being to provide improved means for imparting to the lay a reciprocating movement instead of an oscillating movement as heretofore, and impart this reciprocating movement by links connected to crank arms on suitable shafts, said crank arms being connected to the lay near its upper and lower ends, and operating in unison to impart a reciprocating movement to the lay.

With these and other objects in view, the invention consists in certain novel features of construction and combinations and arrangements of parts, as will be more fully hereinafter described and pointed out in the claims.

In the accompanying drawings: Figure 1, is a broken view in side elevation illustrating my improvements. Fig. 2, is a similar view of the opposite side of the loom. Fig. 3, is a broken view in elevation of the left hand end of the loom. Fig. 4, is a similar view of the right hand end of the loom.

1, represents the frame of the loom, and 2 a shaft extending across the frame and to which power is transmitted in any desired manner.

3, represents the swords, 4 the bar, 5 the comb, and 6 the picker sticks which are pivotally connected to the rod or shaft 7 at the lower end of the swords, and these parts I hereinafter term the lay. The rod or shaft 7 is mounted to slide in slots 8, in brackets 9, secured to the end of the frame 1.

The shaft 2, above referred to, is provided at one end with a large gear 10, which meshes with smaller gears 11, on countershafts 12 and 13 respectively. These countershafts are crank shafts and their cranks are connected by links 14, with the swords near their upper and lower ends, so that as these shafts 12, and 13, are turned, they will impart to the lay a reciprocating movement as the lower end of the lay will be moved backward and forward, as is the upper end of the frame, and I know that this reciprocating movement will give to the woven material a better formation, and a more uniform weave, than can be had by the ordinary oscillating lay.

The picker sticks 6 are connected to straps 15, which extend around the picker sticks 6, thence over pulleys 16, on frame 1 and around or through openings 17 in pivoted links 18. These links 18 are pivoted upon brackets 19, secured to frame 1, and have enlargements 20 on their upper faces. The enlargements 20 lie in the path of movement of rollers 21, at the free ends of crank arms 22, on shaft 2, so that as this shaft 2 revolves, the crank arms 22 will impart a downward movement to the links 18, and compel the picker sticks to swing in and out at the proper time.

The woven uncut plush illustrated at 23, is directed between rollers 24, and 25, mounted on shafts 26, supported in frame 1, and these rollers 24 are preferably provided with prongs or spurs 27 to grasp the material as it passes around them.

Shaft 2 at one end, is provided with a beveled gear 44, which transmits motion to a large beveled gear 45 on the end of a large cam wheel 46, which latter comprises a plurality of cams for moving a plurality of levers 47, but one lever being shown. This lever 47 is fulcrumed between its ends on shaft 48, in a bracket 49, and is adapted to be connected at its respective ends by cords 50, with the vertically movable heddle frame (not shown). Shaft 2 is also provided with a beveled gear 51, which drives a beveled gear 52 on a shaft 53, supported in suitable brackets 54 at one end of frame 1. This shaft 54 has a spur gear 55 thereon, which meshes with a similar gear 56 on a short shaft 57, and beveled gear 58 is fixed to turn with gear 56, and meshes with a beveled gear 59 on a vertical shaft 60. This shaft 60 is provided with two worms 61 and 62, having right and left hand screw threads respectively, and these worms 61 and 62 drive worm wheels 63 and 64 respectively on the ends of the rollers 24, and 25.

Various slight changes might be made in the general form and arrangements of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a loom, the combination with a frame, of a lay mounted in the frame and including a pair of substantially vertical lay swords, a drive shaft, upper and lower crank shafts, gears connecting the drive shaft with the said crank shafts, links connecting the upper crank shaft with said lay swords near the upper ends thereof, and links connecting the lower crank shaft with the lower ends of said lay swords, substantially as described.

2. In a loom, the combination with a frame, having slots therein, a shaft mounted in said slots, vertical lay swords secured on said shaft, devices connected to the lay swords near their upper and lower ends, whereby a horizontal reciprocating movement is imparted to said lay swords and the swords are maintained in vertical position, substantially as described.

3. In a loom, the combination with a frame, having horizontal slots therein, a shaft mounted in said slots, and a lay including a pair of vertical lay swords secured on said shafts, an upper and lower crank shaft, means for driving the crank shafts, and links connecting the crank shafts with the upper and lower ends respectively of said lay swords, whereby a horizontal reciprocating movement is imparted to the lay and the lay swords maintained in vertical position, substantially as described.

4. In a loom, the combination with a frame, a horizontal transverse shaft mounted to reciprocate in said frame, vertical lay swords secured to said shaft, picker sticks pivoted to said shaft, a pair of crank shafts, links connecting said shafts with the upper and lower ends of said lay swords whereby a horizontal reciprocating movement is imparted to the lay and the swords maintained in vertical position, links pivoted to the frame, flexible connecting devices between said links and the picker sticks, and means for oscillating said links, substantially as described.

5. In a loom, the combination with a frame, of a lay sword, a picker stick pivoted at its lower end to the lay sword, and means for reciprocating the lay sword and reciprocating with the latter the pivotal points of the picker stick and the lay sword, substantially as described.

In testimony whereof I have signed my name to this specification in the presence of two subscribing witnesses.

ALBERT MANN.

Witnesses:
C. F. POTTS,
R. H. KRENKEL.

---

Copies of this patent may be obtained for five cents each, by addressing the "Commissioner of Patents, Washington, D. C."